Oct. 25, 1955 N. E. ANDERSON 2,721,923
NOZZLE
Filed Jan. 12, 1952

INVENTOR
Nelson E. Anderson
BY
ATTORNEYS

United States Patent Office 2,721,923
Patented Oct. 25, 1955

2,721,923

NOZZLE

Nelson E. Anderson, Berkeley Heights, N. J., assignor to Air Reduction Company, Incorporated, New York, N. Y., a corporation of New York Application January 12, 1952, Serial No. 266,196

11 Claims. (Cl. 219—8)

This invention relates to nozzles for use in gas-shielded arc welding apparatus, and more particularly to nozzles usable in arc welding apparatus of the type disclosed in my Patent No. 2,586,140, issued February 19, 1952, in my copending application Ser. No. 216,961, filed March 22, 1951, now Patent No. 2,702,333, dated February 15, 1955, and in Joseph M. Tyrner's Patent No. 2,628,302, issued February 10, 1953, in all of which the nozzle employed contacts the workpiece during a spot welding operation.

Each of the above copending applications, all of which are assigned to the same assignee as the present application, discloses an arc welding gun having a barrel, a pistol grip provided with a trigger, and means operating when the trigger is pulled for advancing an electrode holder in the barrel to bring the end of a non-consuming electrode gripped in the holder into contact with the work. Means are further provided for automatically retracting the electrode holder to the limit of its rearward movement as soon as the electrode touches the work to thereby establish the welding arc. The end of the barrel has a nozzle attached to it through which an inert shielding gas such as argon or helium is discharged to shield the tip of the electrode, the arc, and the weld puddle. The end of the nozzle is flat and is held against the work at the place where a spot weld is desired and the trigger is then pulled to initiate the sequence of operations which produce the weld. In order that the interior of the nozzle may be purged of all air that may be initially trapped therein, the face of the nozzle which engages the workpiece during the welding operation is provided with at least one radial slot formed therein which places the interior of the nozzle in communication with the exterior thereof. The inert gas fed through the nozzle for shielding purposes, as above described, escapes from the interior of the nozzle through the slot or slots provided in the nozzle face, expelling all trapped air. In all of the different apparatus heretofore employed, the slots have extended radially. A number of disadvantages result from this heretofore employed nozzle construction due to the radial directioning of the gas escape slots.

In the operation of the apparatus of the type above described, the flow of shielding gas is initiated prior to the establishment of the arc and continues to flow during the arc period and for some time thereafter. When the electrode is advanced to contact the work, it acts as a piston to force shielding gas out of the nozzle through the slots at a rate greater than the normal rate of flow of the gas. When the electrode is retracted to establish the arc, the reverse effect takes place and a small amount of air is sucked or drawn in through the slots and into the nozzle. With radially extending slots, the incoming stream of air is directed into the center of the nozzle and into the arc where it may adversely affect the electrode and/or the weld. It is perhaps the primary object of the present invention to overcome this disadvantage which inherently results in apparatus of the type described wherein the nozzle is provided with radially extending gas escape slots.

Another disadvantage of the radially slotted nozzle which, while it does not affect the soundness of the weld, is of practical importance from the operational point of view, is that a direct line of vision to the arc is provided. This makes it necessary for the operator to wear protective eye shields and increases operator hazard, both of which lead to less operator efficiency and comfort than will henceforth be possible by reason of this invention.

In accordance with the present invention, the above disadvantages of the heretofore employed nozzles for the type of apparatus described may be obviated by providing a nozzle having at least one non-radially extending slot or passageway in or adjacent the work-engaging face thereof. As will be more fully described hereinafter, this slot or passageway is preferably a straight line slot or passageway and extends outwardly from the nozzle bore tangentially from the periphery thereof.

One type of nozzle according to my invention and capable of providing all the advantages thereof is illustrated in the accompanying drawings in which.

Figure 1:
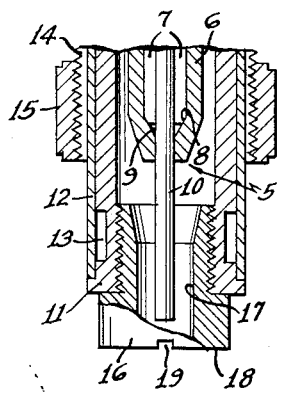
Fig. 1 is a view substantially wholly in section of the outer end portion of the barrel of the welding gun disclosed in my aforementioned application Ser. No. 216,961, illustrating one type of nozzle heretofore employed.
Figure 2:
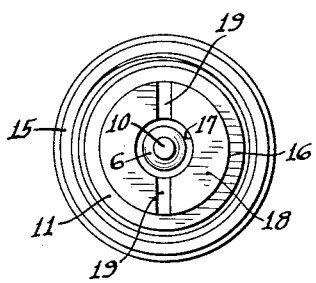
Fig. 2 is an end view of the same.

The portion of the welding gun illustrated in Figs. 1 and 2 comprises an electrode holder 5 made up of an outer tube 6 and an inner electrode carrier tube (the major portion of which is not shown herein) having a limited sliding movement relative to the outer tube and the forward end of which is slotted longitudinally through a short distance to form a number of resilient electrode-gripping jaws 7. The forward ends of these jaws are externally beveled as at 8 and cooperate with an internal conical surface 9 near the forward end of the outer tube 6 so that when the two tubes are relatively moved into greater telescoping relation, the resilient jaws 7 are forced inwardly into gripping engagement with a non-consuming electrode 10 of tungsten, or the like, carried by the inner tube, and when the two tubes are relatively moved in the opposite direction the gripping of the resilient jaws on the electrodes is released.

The portion of the welding gun surrounding the illustrated end of the electrode holder 5 and the tip of the electrode 10 comprises an inner tubular member 11 surrounded by an outer sleeve 12. An annular channel 13 is formed in the peripheral surface of the inner tube member 11 adjacent its end and with the portion of sleeve 12 which overlies it forms a cooling water passage. The sleeve 12 forms a bearing surface for a portion of the gun casing 14 upon which is threaded a retaining nut 15. A nozzle 16, having a bore 17 extending longitudinally and axially therethrough and a flat work-engaging face 18, is threaded into the outer end of the inner tubular member 11. A pair of diametrically opposite slots 19 are formed in the work-engaging face 18 of the nozzle and extend radially from the bore 17 to the annular outer surface of the nozzle.

In performing a welding operation with the above described apparatus, the nozzle 16 is placed against the workpiece with its flat face 18 in continuous contact therewith. The flow of gas is then initiated and gas flows through the passage between electrode holder 5 and the tubular member 11 and downwardly around the electrode into the nozzle and thence outwardly from within the nozzle through escape slots 19, thus purging the interior of the nozzle and the welding zone of all entrapped air.

After a predetermined period of time, the electrode holder 5 and the electrode held therein are advanced until the tip of the electrode 10 contacts the work. Both are then automatically retracted, an arc being thereby formed between the tip of the electrode and the workpiece. When the welding operation is complete, the arc is extinguished and the flow of gas terminated a predetermined length of time thereafter.

As pointed out above, when the electrode holder is advanced to place the electrode in contact with the workpiece, gas is forced out through slots 19 at a rate in excess of that at which it is supplied to the nozzle. Subsequently when the electrode holder is withdrawn to withdraw the electrode and establish the arc, a decrease in the pressure within the illustrated end of the apparatus results and some air is sucked or drawn into the nozzle through the slots 19. By reason of the fact that the slots 19 are radially directed, the air thus drawn into the nozzle is directed inwardly therein toward the center to affect adversely the electrode and/or the weld.

Figure 3:
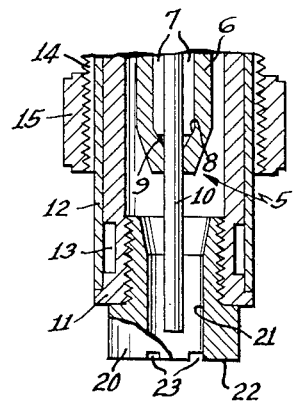
Fig. 3 is a view substantially wholly in section of the same apparatus, provided, however, with a nozzle constructed in accordance with the present invention.
Figure 4:
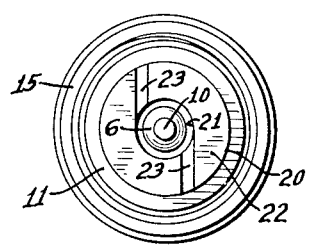
Fig. 4 is an end view of the apparatus illustrated in Fig. 3.

Referring now to Figs. 3 and 4, a nozzle 20 constructed in accordance with this invention and mounted in the same apparatus as illustrated in Fig. 1, will be described. The nozzle 20 may be of the same general exterior shape and contour as is nozzle 16 and is provided with a bore 21 and a flat work-engaging face 22. However, it is provided with gas escape slots 23 formed in its work-engaging face 22 which extend outwardly from the bore 21 in a direction substantially tangentially from the periphery of the bore. Preferably these slots are straight line slots, as illustrated, but the most important characteristic thereof is that the inner portions of the slots, at least, lead away from the bore in a direction tangentially of the periphery thereof. As illustrated in Fig. 3, the nozzle 20 is threadedly mounted in the apparatus in the same manner as is the previously used type of nozzle 16.

Among the advantages derived from the use in apparatus of the type here described, and more fully described in the aforementioned copending applications, of a nozzle such as nozzle 20 having tangentially extending slots formed in the work-engaging face thereof, is that the arc is no longer visible through the slots. Thus the safety of the operator is greatly enhanced as is his comfort and efficiency.

Another advantage which, as pointed out, is perhaps the main advantage of the nozzle construction is that any air drawn into the interior of the nozzle through the slots when the electrode is withdrawn to establish the arc is not directed toward the electrode tip or the arc, but rather is introduced into the interior of the nozzle in a swirling motion at the extreme outer portion thereof and as remote as possible from the electrode tip and the arc. In this connection it should be pointed out that where, as in the nozzle 20 illustrated, more than one slot 23 is employed, it is necessary that their directional sense be the same. That is, the slots must lead into bore 21 in the same circular direction so that if any air is drawn into the nozzle through the slots the effect with respect to the desired swirling motion is additive rather than opposed. Thus all of a plurality of slots in a nozzle must lie on the same side, in a circular direction, of the radii extending from their respective points of juncture with the bore to the center of the bore.

Furthermore, the length of the slots or passageways is increased considerably for nozzles having the same wall thickness adjacent the face thereof, and there is the possibility that the small amount of air which tends to be drawn into the nozzle when the electrode is retracted may never actually reach the interior of the nozzle.

Another advantage is that the tangential direction of the slots produces a swirling or rotary motion of the gas in the nozzle as the shielding gas passes therethrough and thus results in any air which may have infiltrated into the nozzle from any source being maintained outwardly from the arc by the centrifugal action present which throws the air, which is heavier than the inert shielding gas employed, outwardly against the inner wall of the nozzle bore. This characteristic of the gas shield improves the shield and prevents any adverse effect upon the electrode and/or the weld from the air.

While it is contemplated that the escape passages for the gas formed within the nozzle take the form of slots such as slots 23, it is possible that small escape passages might be formed wholly within the nozzle wall adjacent the work-engaging face thereof. This and other modifications may, of course, be made in the nozzle of the invention without departing from the invention as set forth in the appended claims.

I claim:

1. A nozzle for use with gas shielded arc welding apparatus comprising a body, a bore extending through said body, and a passageway adjacent one end of said body extending through the wall thereof from the bore in a direction other than radially of the bore when viewed in a direction axially of the bore, said passageway placing the bore in communication with the outer surface of said body.

2. A nozzle for use with gas shielded arc welding apparatus comprising a body, a bore extending longitudinally and axially through said body, and a straight line passageway adjacent one end of said body extending through the wall thereof from the bore in a direction other than radially of the bore when viewed in a direction axially of the bore, said passageway placing the bore in communication with the outer surface of said body.

3. A nozzle for use with gas-shielded arc welding apparatus comprising a body, a bore extending through said body, and a passageway adjacent one end of said body extending through the wall thereof from the bore in a direction other than radially of the bore when viewed in a direction axially of the bore, said passageway placing the bore in communication with the outer surface of said body, at least the portion of the passageway adjacent the bore extending tangentially from the periphery of the bore.

4. A nozzle for use with gas-shielded arc welding apparatus comprising a body, a bore extending through said body, and a straight line passageway adjacent one end of said bore extending through the wall of said body tangentially from the periphery of said bore and placing the bore in communication with the outer surface of the body.

5. A nozzle for use with gas-shielded arc welding apparatus comprising a body, a bore extending longitudinally through said body, a flat face at one end of said body and surrounding the adjacent end of the bore, and a slot in said flat face extending through the wall of the body from said bore in a direction other than radially of the bore when viewed in a direction axially of the bore, said slot placing the bore in communication with the outer surface of said body.

6. A nozzle for use with gas-shielded arc welding apparatus comprising a body, a bore extending longitudinally through said body, a flat face at one end of said body and surrounding the adjacent end of the bore, and a slot in said flat face extending through the wall of the body from said bore in a direction other than radially of the bore when viewed in a direction axially of the bore, said slot placing the bore in communication with the outer surface of said body, at least a portion of the slot adjacent the bore extending tangentially from the periphery thereof.

7. A nozzle for use with gas-shielded arc welding apparatus comprising a body, a bore extending longitudinally through said body, a flat face at one end of said body and surrounding the adjacent end of the bore, and a straight line slot in said flat face extending through the wall of the body tangentially from the periphery of said bore and placing the bore in communication with the outer surface of said body.

8. In an arc welding gun having a barrel, means for advancing an electrode holder in the barrel to bring the end of a non-consuming electrode gripped in the holder into contact with a workpiece, means for automatically retracting the electrode holder to the length of its rearward movement as soon as the electrode touches the work to thereby establish the welding arc, and means for supplying an inert gas to the interior of the barrel, the improvement which comprises a nozzle mounted on one end of the barrel comprising a body, a bore extending through said body and surrounding the arc end of the electrode, and a passageway adjacent the free end of the body extending through the wall thereof from the bore in a direction other than radially of the bore when viewed in a direction axially of the bore, said passageway placing the bore in communication with the outer surface of said body.

9. Apparatus according to claim 8 in which at least the portion of the passageway adjacent the bore extends tangentially from the periphery of the bore.

10. In an arc welding gun having a barrel, means for advancing an electrode holder in the barrel to bring the end of a non-consuming electrode gripped in the holder into contact with a workpiece, means for automatically retracting the electrode holder to the length of its rearward movement as soon as the electrode touches the work to thereby establish the welding arc, and means for supplying an inert gas to the interior of the barrel, the improvement which comprises a nozzle mounted on one end of the barrel comprising a body, a bore extending longitudinally through said body and surrounding the arc end of the electrode, a flat face at the free end of said body and surrounding the adjacent end of the bore, and a slot in said flat face extending through the wall of the body from said bore in a direction other than radially of the bore when viewed in a direction axially of the bore, said slot placing the bore in communication with the outer surface of said body.

11. Apparatus according to claim 10 in which at least that portion of the slot adjacent the bore extends tangentially from the periphery of the bore.

References Cited in the file of this patent

UNITED STATES PATENTS

| | | |
|---|---|---|
| 1,638,336 | Hines | Aug. 9, 1927 |
| 2,491,479 | Dash | Dec. 20, 1949 |
| 2,510,415 | Pitcher | June 6, 1950 |